Figure 1:
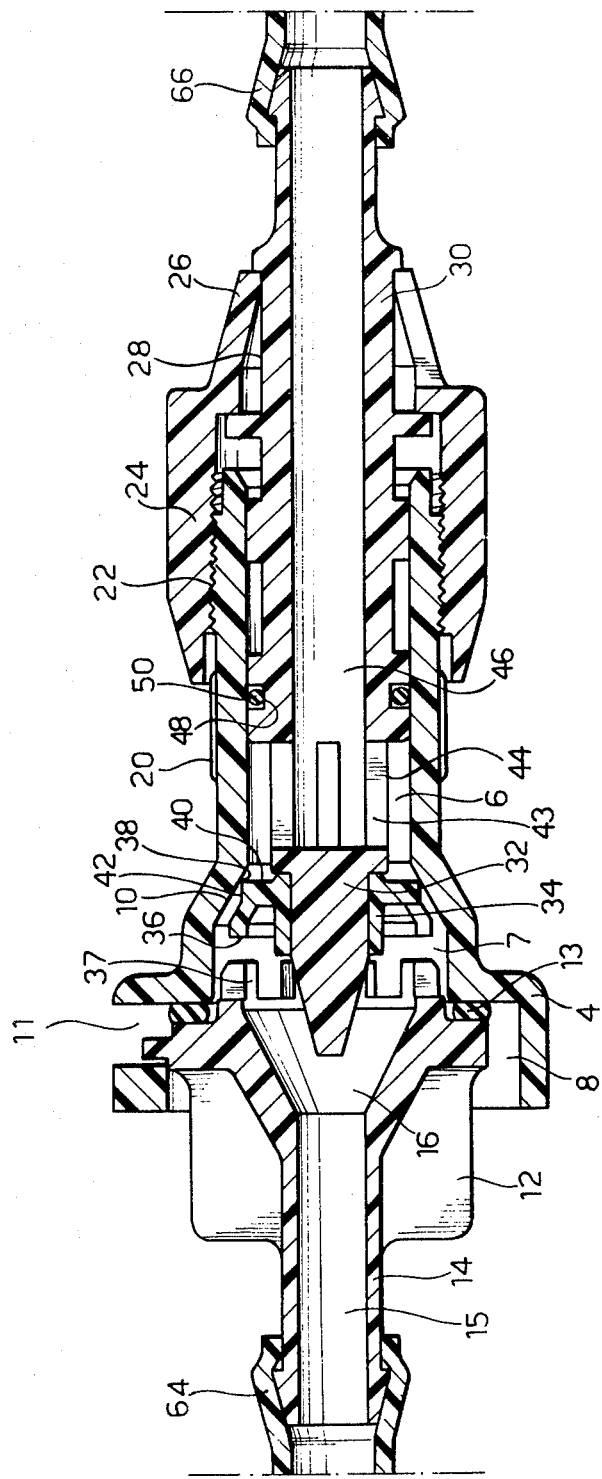

United States Patent [19]

Maggioni et al.

[11] 4,244,555
[45] Jan. 13, 1981

[54] SELF-CLEANING VALVE FOR REGULATING THE FLOW OF LIQUID IN IRRIGATION SYSTEMS

[75] Inventors: Virginio Maggioni, Rosta; Renzo Moretti, Cambiano, both of Italy

[73] Assignee: Centro Ricerche Fiat S.p.A., Orbassano, Italy

[21] Appl. No.: 41,968

[22] Filed: May 23, 1979

[30] Foreign Application Priority Data

Jul. 4, 1978 [IT] Italy .................. 68563 A/78

[51] Int. Cl.³ .................................. F16K 31/44
[52] U.S. Cl. .............................. 251/82; 251/340
[58] Field of Search ............ 251/340, 347, 82; 285/DIG. 22; 239/569

[56] References Cited

U.S. PATENT DOCUMENTS

| | | | |
|---|---|---|---|
| 2,892,614 | 6/1959 | Majneri | 251/347 |
| 3,123,337 | 3/1964 | Peras | 251/340 |
| 3,245,703 | 4/1966 | Marly | 285/DIG. 22 |
| 3,733,557 | 5/1973 | Hammond | 285/DIG. 22 |
| 3,856,262 | 12/1974 | Jordon | 251/340 |
| 3,985,332 | 10/1976 | Walker | 251/340 |

FOREIGN PATENT DOCUMENTS 1115665  4/1956  France ..................... 251/340

Primary Examiner—Martin P. Schwadron
Assistant Examiner—A. Michael Chambers
Attorney, Agent, or Firm—Sughrue, Rothwell, Mion, Zinn & Macpeak

[57] ABSTRACT

A self-cleaning flow-regulating valve for an irrigation system has a displaceable element which is adjustable axially within a valve body by rotation of an external nut to adjust the position relative to two opposing seats of a floating bush which defines the size of a flow passage for irrigating liquid.

2 Claims, 2 Drawing Figures

SELF-CLEANING VALVE FOR REGULATING THE FLOW OF LIQUID IN IRRIGATION SYSTEMS

The present invention relates to a self-cleaning valve for regulating the flow of liquid in irrigation systems. The invention is particularly applicable to irrigation systems in which different plants under cultivation have to be irrigated with different amounts of liquid.

In the Applicants' Italian Patent Application No. 70139-A/76 an automatically controlled irrigation system is described for irrigating plants under cultivation in which liquid is delivered in doses to a number of outlets, the quantity of liquid delivered to each outlet being independent of the position of the outlet relative to the source of irrigating liquid.

Such a system has, however, the disadvantage that when different plants have to be irrigated it is not possible to supply to each individual plant an appropriate dose of liquid, since once the delivery of liquid has been pre-set it is the same for all the plants. This is disadvantageous, since it is known that for optimal cultivation irrigation should be metered according to each individual type of plant under cultivation.

Furthermore, in most known irrigation systems there is a tendency for deposits to form in the flow passages of the irrigating liquid. Such deposits result from particles carried by the irrigating liquid: after a certain time such particles cause clogging or even complete blockage of the liquid flow passages causing partial or total stoppage of the circulation of the irrigating liquid, and adversely affecting normal operation of the irrigation system.

An object of the invention is to eliminate the aforesaid disadvantages by providing a self-cleaning valve for regulating the delivery of liquid in irrigation systems. A further object is to provide such a valve of low cost and simple construction which is especially suitable for use with automatic irrigation systems of the kind described in the earlier Italian Patent Application No. 70139-A/76.

According to the present invention there is provided a self-cleaning valve for regulating the flow of liquid in irrigation systems, characterised in that the valve comprises a body having an inlet and a nut screwed onto the said body and connected to an element which is displaceable axially within the body, the said element supporting, at its end which faces towards the inlet, a floating bush which defines a passage for the controlled flow of liquid.

Figure 2:
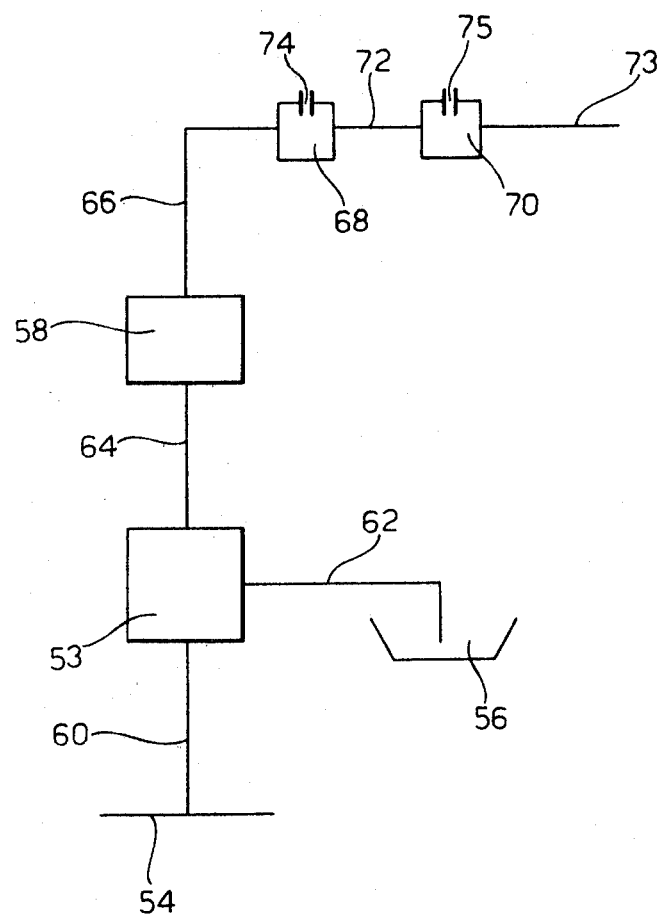

The present invention will be further described, by way of example, with reference to the accompanying drawings, in which:

FIG. 1 is an axial section of a regulator valve according to one embodiment of the invention, and FIG. 2 is a block schematic diagram of an irrigation system in which the regulator valve is fitted.

Referring to FIG. 1, the illustrated regulator valve has a body 4 substantially in the form of a hollow cylinder having three internal cylindrical chambers 6, 7 and 8 of progressively increasing diameter. A frusto-conical seat 10 is situated between the intermediate chamber 7 and the chamber of smallest diameter.

An aperture 11 in the wall of the body 4 communicates with the chamber 8. A locking projection carried by a pipe union 12 snap-engages in the aperture 11, an annular sealing element 13 being interposed between a flange on the pipe union 12 and an annular shoulder between the chambers 7 and 8. The pipe union 12 has an integral inlet pipe section 14 and has internal flow passages 15,16 through which a source of irrigating liquid under pressure may be connected by fitting an inlet hose 64 over the end of the pipe section 14.

In correspondence with the outlet end of the chamber 6 of the body 4 is formed with external longitudinal ribs 20 or notches adjacent which the body 4 is formed with a threaded section 22. A nut 24 is screwed onto the threaded section 22, the nut 24 being provided externally with a reference notch or marking (not shown) which cooperates with the ribs or notches 20 on the body 4 to provide a visual indication of the degree of opening of the valve.

The nut 24 is formed at one end with fingers 26 which snap-engage into an external annular neck 28 in a tubular element 30 which is slidable coaxially within the chamber 6 of the body 4.

The tubular element 30 is provided at its internal end with a rod 32 upon which a floating bush 34 of plastics material is seated for longitudinal sliding movement. One end face 36 of the bush 34 is shown in abutment with a seating 37 at one end of the pipe union 12. The circular edge 38 defined between the other end face 40 and an outer cylindrical surface 42 of the bush 34 bears against the frusto-conical seat 10 when the valve is closed. The valve opens when the said edge 38 is spaced from the said seat 10, defining an annular flow passage for the irrigating liquid.

A series of longitudinal slots 43, formed in a section of the tubular element 30 of smaller diameter than that of the chamber 6, communicate with a central bore 46 in the tubular element 30. The bore 46 affords communication, in use of the valve, with an irrigation circuit through an outlet hose 66 which fits over the external end of the tubular element 30.

The tubular element 30 has a piston portion which slides in contact with the wall of the chamber 6 and which has a circumferential groove 48 in which a sealing ring 50 is seated.

The regulator valve of FIG. 1 is intended for installation in an irrigation system one example of which is illustrated diagrammatically in FIG. 2.

The irrigation system includes a three-way automatically controlled valve 53 connected respectively to an irrigating (water) supply source 54, through a pipe 60, to a discharge or drain 56 through a pipe 62, and to the inlet hose 64 connected to the union 12 of the regulator valve illustrated in FIG. 1, and designated 58 in FIG. 2.

The control valve 53 has a first setting in which it delivers water under pressure from the supply source, e.g. a water main, to the inlet hose 64 of the valve 58, and a second setting in which it delivers water to the discharge or drain 56, creating low pressure in the irrigation circuit connected to the valve 58.

The outlet hose 66 connects the outlet end of the tubular element 30 of the valve 58 to a delivery device 68 which is connected in series with a further delivery device 70, similar to the device 68 via a pipe 72, and so on to further delivery manifolds which may be connected in series via a pipe 73. The series-connected delivery may either form a closed loop connected at its ends to the control valve 53, or alternatively may be closed at its end furthest from the valve 53, according to the type of control valve used.

The said devices 68, 70 are fitted with respective flexible bodies which, under the action of pressure of the irrigating liquid, deform to allow liquid to flow from the said delivery devices 68, 70 through outlet spray nozzles 74, 75 respectively to irrigate respective plants under cultivation.

For every different species of plant which is to be irrigated, a different control valve 53 and regulator valve 58 would be provided as required together with appropriately positioned delivery devices 68, 70 and spray nozzles 74, 75.

The operation of the valve will now be described.

In its idle condition, the control valve 53 connects two of its three ways, i.e. more particularly that connected to the pipe 62 to the hose 64, thereby placing the inlet of the regulator valve 58 in communication with the discharge or drain 56 and closing off the pipe 60 leading from the water supply source 54.

The control valve 53 is operated under the influence of the pressure of the irrigating water supplied through the pipe 60 to shut off communication between the discharge or drain 56 and to connect the hose 64 of the regulator valve 58 with the pipe 60, so that water under pressure is delivered from the source 54 to the union 12 of the valve 58.

The water under pressure supplied to the union 12 acts upon the bush 34, moving the latter toward the frusto-conical seat 10 of the valve body 4.

The position of the tubular element 30 within the body 4 is adjustable by rotation of the nut 24, which regulates the effective flow cross section of the irrigant liquid passage defined between the edge 38 of the bush 34 and the frusto-conical seat 10, which will be dependent upon the distance between the bush 34 and the seat 10. Thus by rotation of the nut 24 on the threaded section 22 of the body 4, the nut 24 is displaced axially and carries with it the tubular element 30 by virtue of the engagement of the fingers 26 in the neck 28, moving the tubular element 30 either in the direction of the inlet of the regulator valve 58, or in the opposite direction, that is, in the direction of the outlet of the said valve, according to the direction of rotation of the nut 24.

Upon movement of the tubular element 30 towards the inlet pipe section 14 of the regulator valve 58 the bush 34 is moved in the same direction so that its edge 38 becomes spaced from the frusto-conical seat 10, defining an annular flow passage the effective cross section of which will be dependent upon the displacement of the tubular element 30.

To facilitate regulation of the delivery of irrigating water the nut 24 is rotated until the reference notch or marking on the nut coincides with that one of the ribs or notches 20 on the body 4 which corresponds to the desired delivery.

The irrigating water passes through the annular flow passage of the valve, predetermined as described, and enters the chamber 6, from which the water flows through the slots 43 into the bore 46 of the tubular element 30, passing through the latter into the outlet hose 66, which conducts the liquid to the delivery device 68.

Because of the pressure of irrigating water, the flexible body within the delivery device 68 deforms so as to allow the liquid to flow from the inlet to the outlet of the said delivery device through the pipe 72 into the next adjacent delivery device 70, and so on until the circuit is completely filled.

When the water pressure in the various delivery devices reaches the operating pressure the system is in a stable condition and ready to go into operation.

By means of manual or automatic control, according to the kind of control valve 53 used, the communication between the water supply pipe 60 and the inlet hose 64 of the regulator valve 58 is cut off, and the connection is re-established between the pipe 62 connected to the discharge or drain 56 and the said inlet hose 64.

The pressure of the irrigating water in the inlet pipe section 14 of the union 12 will then fall, the bush 34 being responsive to the liquid pressure in the chamber 6, which displaces the bush 34 upon the rod 32 of the tubular element 30, moving the bush 34 into sealing contact with the seating 37 of the union 12.

In this position of the bush 34 the valve 58 presents an annular flow passage for the irrigating water which is equal in effective area to the input flow cross section of the internal flow passages 15, 16 of the pipe union 12 and to the flow cross section of the outlet passage formed by the bore 46 of the tubular element 30, thus allowing substantially unrestricted flow of water from regulator valve 58 towards the control valve, 53, this water flowing into the discharge or drain 56.

As a result of the discharge of liquid through the control valve 53, a depression is formed in the outlet hose 66 comparable to that which exists in the pipe 72. The liquid which is in the pipe 72 accordingly returns to the delivery device 68, and as a result of the pressure of this liquid the flexible body of the said delivery device deforms, in the opposite direction to the deformation occuring upon the delivery of water, allowing the water to flow through the nozzle 74 of the delivery device so as to irrigate the plant or plants served by the nozzle 74.

Next, the same occurs in similar fashion in the pipe 73 and the delivery device 70 and is repeated for all the delivery devices of the irrigation system connected to the valve 58.

When changing the kind of plants under cultivation to be irrigated, it is necessary only to calibrate the regulator valve 58 in the manner described, by means of the nut 24.

Where the end face 36 and the edge 38 of the bush 34 of the regulator valve 58 come into contact with the seating 37 and the frusto-conical seat 10 respectively, a self-cleansing action occurs, assisted by the flow of irrigating liquid through the regulator valve in two opposite directions alternately, thereby preventing clogging or blockage of the valve, which would be prejudicial to its normal operation.

We claim:

1. A self-cleaning valve for regulating the flow of an irrigating liquid in irrigation systems, said valve comprising a body having inlet means, a pipe union detachably connected to said body and having a seating extending into said inlet means, a nut threaded onto said body, a tubular element connected to said nut and displaceable axially within said body by rotation of said nut, said element having a central bore and longitudinal radially directed slots through which said central bore communicates with said inlet means, said body having a frusto-conical seat adjacent said inlet means, a floating bush within said body supported on the end of said element adjacent said inlet means, said floating bush defining an adjustable passage between said seat and said bush and shoulder means on said element for moving said bush away from said seat upon axial displacement of said element toward said inlet means, said bush being movable by liquid flow in a direction from said central bore to said pipe union into engagement with said seating and said bush being movable towards said frusto-conical seat by liquid flow in a direction from said pipe union to said central bore for controlling the flow of irrigating liquid from the inlet means into the tubular element bore to a communicating outlet means as determined by the limiting position of said shoulder means said seating including means permitting flow of liquid from said outlet means between the bush and said seating to said inlet means regardless of the limiting position of the shoulder means.

2. Valve as in claim 1, wherein the inlet means of the valve body has a pipe fitting connected to a source of irrigating liquid under pressure and the tubular element has an outlet connected to an irrigation system downstream of said valve.

* * * * *